US005478920A

United States Patent [19]
Drysdale

[11] Patent Number: 5,478,920
[45] Date of Patent: Dec. 26, 1995

[54] CYCLIC ETHER POLYMERIZATION USING SILICON COMPOUND ACCELERATORS

[75] Inventor: Neville E. Drysdale, Newark, Del.

[73] Assignee: E. I. Du Pont de Nemours and Company, Wilmington, Del.

[21] Appl. No.: 93,242

[22] Filed: Jul. 16, 1993

[51] Int. Cl.$^6$ .............................. C08G 59/68; C08G 65/04
[52] U.S. Cl. .................... 528/410; 528/411; 528/412; 528/413; 528/414; 528/415; 528/416; 568/613; 568/617
[58] Field of Search ...................... 528/410, 411, 528/412, 413, 414, 416, 415; 568/617, 613

[56] References Cited

U.S. PATENT DOCUMENTS

| | | | |
|---|---|---|---|
| 3,344,088 | 9/1967 | Miller | 568/617 |
| 3,842,019 | 10/1974 | Kropp | 260/2 EP |
| 3,864,287 | 2/1975 | Matsuda et al. | 260/2 X A |
| 4,303,782 | 12/1981 | McHale et al. | 528/416 |
| 4,324,873 | 4/1982 | Wada | 528/410 |
| 4,599,401 | 7/1986 | Koleske | 528/408 |
| 4,644,051 | 2/1987 | Van Geenen | 528/323 |
| 4,988,797 | 1/1991 | Wardle et al. | 528/408 |
| 5,001,207 | 3/1991 | Saegusa | 528/49 |
| 5,084,586 | 1/1992 | Farooq | 556/181 |
| 5,124,417 | 6/1992 | Farooq | 526/90 |

FOREIGN PATENT DOCUMENTS

| | | | |
|---|---|---|---|
| 0105080 | 11/1984 | European Pat. Off. | C07C 41/03 |
| 0485637A1 | 5/1992 | European Pat. Off. | C08G 65/26 |
| 2212364 | 12/1973 | France | C08G 23/02 |
| 2459163 | 6/1976 | Germany | C08G 65/2033 |
| 64599 | 6/1976 | Japan | |
| 113024 | 6/1984 | Japan | 528/411 |

OTHER PUBLICATIONS

S. Hayase, et al., *J. Poly. Sci., Chem. Ed.*, 19, 2185–2194 (1981).
S. Hayase, et al., *J. Poly Sci., Chem. Ed.*, 19, 2977–2985 (1981).
S. Hayase, et al., *J. Poly Sci. Chem. Ed.*, 20, 3155–3165 (1982).
H. Lee & K. Neville,"Handbook of Epoxy Resins", McGraw–Hill Book Co., New York, N.Y. p. 15–15 (Reissue 1982).
R. W. Lenz, "Organic Chemistry of Synthetic High Polymers", Interscience Publishers, New York, N.Y., 531–532 (1967).
Maeda, S., *Chemical Abstracts*, 85, Abstract No. 124661r (1976).
Crivello, J. V. et al, *Makromol. Chem., Macromol. Symp.*, 54/55, 179–188 (1992).
Hayase, S. et al., *Macromolecules*, 18, 1799–1804 (1985).
J. S. Hrkach et al., *Macromolecules*, 23:4042–4046 (1990).
G. A. Olah et al., *J. Appl. Polym. Sci.*, 45:1355–1360 (1992).
S. L. Borkowsky et al., *Organometal.*, 10:1268–1274 (1991).

*Primary Examiner*—Melvyn I. Marquis
*Assistant Examiner*—D. R. Wilson

[57] ABSTRACT

When selected silicon compounds are added to cationic polymerizations of cyclic ethers such as oxiranes and tetrahydrofurans, the rate of polymerization is often increased, and novel polyethers are produced. The polyether products are useful as monomers and macromonomers, particularly after hydrolysis of silicon containing end groups.

12 Claims, No Drawings

CYCLIC ETHER POLYMERIZATION USING SILICON COMPOUND ACCELERATORS

FIELD OF THE INVENTION

Disclosed herein is a process for the cationic polymerization of cyclic ethers, wherein an accelerator (co-catalyst) is a selected silicon compound. Polyethers, some of which are novel compositions, are produced rapidly, often in good yields.

TECHNICAL BACKGROUND

Cyclic ethers are polymerized by various means to give products of widespread utility. For instance, ethylene oxide is polymerized to polyethylene oxide which is useful for (in lower molecular grades) ceramics, cosmetics, lubricants, polyurethanes, (and in higher molecular weight grades), packaging film, denture adhesives, lubricants, and flocculation, and tetrahydrofuran (THF) is polymerized to poly(tetramethylene ether) glycol which is useful in the preparation of Spandex fibers, polyurethane resins useful in elastomeric parts, and thermoplastic elastomers useful for molding various mechanical parts. Therefore, improved methods of making these polymers are sought.

One general method for the polymerization of cyclic ethers is the so-called cationic mechanism. In this type of polymerization, an acid, usually a Bronsted or Lewis acid, is used as the catalyst. Accelerators (sometimes also called co-catalysts) are sometimes used, and these can affect both the rate and yield of the polymerization, as well as the structure (for example end groups) of the polyether produced. Disclosed herein is a new class of accelerators for the cationic polymerization of cyclic ethers.

J. S. Hrkach, et al., Macromolecules, vol. 23, p. 4042–4046 (1990) describe the polymerization of tetrahydrofuran using trimethylsilyl trifluoromethanesulfonate as the catalyst.

German Patent Application 2,459,163 describes the polymerization of THF using a combination of ferric chloride and carboxylic anhydride as catalyst.

U.S. Pat. Nos. 5,084,586 and 5,124,417 describe the cationic polymerization of various monomers, including cyclic ethers, using onium cations, whose corresponding anions are fluororalkylsulfatometallates. Onium ion catalyzed cationic polymerizations are well known cationic polymerizations.

Japanese Patent Application 51-82397 describes the polymerization of tetrahydrofuran using a combination of fluorosulfonic acid and a carboxylic acid as catalysts.

T. Misaki, et al., Nippon Kagaku Kaishi, p. 168–174 (1973) report on the polymerization of THF using a combination of metal aceylacetonates and acetyl chloride.

With the exception of J. R. Hrkach, et al., none of these references mentions the use of silicon compounds as catalysts or accelerators in the polymerizations.

SUMMARY OF THE INVENTION

This invention concerns a process for cationic polymerization of cyclic ethers by contacting a cationic catalyst for the polymerization of cyclic ether with one or more oxiranes, oxetanes, tetrahydrofurans, oxepanes, 1,3-dioxolanes or 1,3,5-trioxanes, to produce a polyether, wherein the improvement comprises an accelerator in contact with the polymerization mass, said accelerator having bound to silicon a group whose conjugate acid has a pKa in water of less than about 16, and provided that:

said accelerator does not significantly react with said cationic catalyst for said cationic polymerization in the absence of said oxiranes, oxetanes, tetrahydrofurans, oxepanes, 1,3-dioxolanes or 1,3,5-trioxanes; and said accelerator does not by itself cause polymerization of said oxiranes, oxetanes, tetrahydrofurans, oxepanes, 1,3-dioxolanes or 1,3,5-trioxanes to produce a polyether.

This invention also concerns a process for the production of polyethers, comprising, contacting at about −80° C. to about 130° C. a Bronsted or Lewis acid with one or more oxiranes, oxetanes, tetrahydrofurans, oxepanes, 1,3-dioxolanes or 1,3,5-trioxanes, and an accelerator, wherein said accelerator is a silicon compound wherein a group whose conjugate acid has a pKa of less than 16 in water is bound to a silicon atom, and provided that:

said accelerator does not significantly react with said Bronsted or Lewis acid in the absence of said oxiranes, oxetanes, tetrahydrofurans, oxepanes, 1,3-dioxolanes or 1,3,5-trioxanes; and said accelerator does not by itself cause polymerization of said oxiranes, oxetanes, tetrahydrofurans, oxepanes, 1,3-dioxolanes or 1,3,5-trioxanes to produce a polyether.

This invention also concerns a polyether of the structure

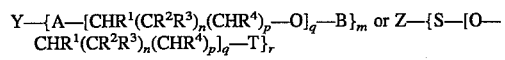

wherein:

Y is a hydrocarbyl or substituted hydrocarbyl group with m free bonds;

Z is a hydrocarbyl, substituted hydrocarbyl, siloxy or silyl group with r free bonds;

A is a group whose conjugate acid has a pKa of less than 16 in water;

T is a group whose conjugate acid has a pKa of less than 16 in water;

S is a silyl group bound to a terminal oxygen of a polyether segment and to Z;

B is a silyl group bound to a terminal oxygen of a polyether segment;

each $R^1$, $R^2$, $R^3$, and $R^4$ is independently hydrogen or hydrocarbyl containing 1 to 20 carbon atoms;

each n is independently 0, 1 or 2;

m is an integer of 1 to 5;

each p is independently 0 or 1;

each q is independently an integer of 3 or more;

r is an integer of one or more;

provided that when p is 0, n is also 0.

DETAILS OF THE INVENTION

In the polymerization process described herein one or more cyclic ethers, oxiranes, oxepanes, oxetanes, tetrahydrofurans, 1,3,5-trioxanes and 1,3-dioxolanes may be polymerized to form polyethers. Oxirane (more commonly called epoxide) is herein given it usual structure, a saturated three membered ring containing two carbon atoms and one oxygen atom. Oxetane is also given its common meaning, a saturated four membered ring containing 3 carbon atoms and one oxygen atom. The term 1,3-dioxolane means a saturated 5 membered ring which contains two oxygen atoms separated by 1 carbon atom. The term 1,3,5-trioxane means a six membered ring containing 3 oxygen atoms in which the oxygen atoms and carbons atoms are alternated. The term oxepane means a membered ring containing one oxygen atom. The terms oxirane, oxetane, oxepane, 1,3-dioxolane, 1,3,5-trioxane and tetrahydrofuran include compounds containing those ring systems which are substituted with hydrocarbyl or hydrocarbylene groups containing 1 to 20 carbon atoms. The hydrocarbylene groups form carbocyclic rings, which include bicyclic, tricyclic, etc., systems. By a hydrocarbylene group herein is meant a divalent radical containing carbon and hydrogen which is part of a carbocyclic ring.

Useful protic acids include perfluoroalkylsulfonic acids including trifluoromethanesulfonic acid, fluorosulfonic acid a perfluoroinated polymer containing sulfonic acid groups such as Nafion, heteropoly acids, acidic clays, and other very strong acids. Useful Lewis acids include selected metal salts of perfluoroalkylsulfonic acids, particularly those of trifluoromethanesulfonic acid (herein sometimes referred to as triflates), and onium salts such as oxonium salts. Preferred catalysts are metal triflates and other perfluoroalkylsulfonates, particularly those of divalent strontium, barium, cobalt, rhodium,, iridium, palladium, platinum, chromium, zinc, cadmium or mercury; trivalent scandium, yttrium, a rare earth metal, arsenic, antimony, bismuth, gold, iron, ruthenium, osmium, aluminum, gallium, indium or thulium; tetravalent titanium, zirconium, hafnium, molybdenum, silicon, germanium, tin, or lead; pentavalent rhenium, vanadium, niobium or tantalum; and hexavalent tungsten. Preferred triflates are those of strontium, scandium yttrium, the rare earth metals, titanium, zirconium, hafnium, vanadium, niobium, tantalum, chromium, molybdenum, tungsten, rhenium, iron, ruthenium, palladium, copper, gold, zinc, tin and bismuth. More preferred metals are yttrium, the rare earth metals, scandium, zirconium, tantalum, zinc and bismuth. Especially preferred metals are yttrium, ytterbium, dysprosium, erbium, neodymium, lanthanum, scandium, zirconium, tantalum, zinc and bismuth. Another preferred metal is "mischmetall", which is a mixture of rare earth metals as obtained from the ore. All of the preferred metals are in the valence states noted at the beginning of this paragraph. By a triflate or perfluoroalkylsulfonate herein is meant a compound which contains at least one triflate or perftuoroalkylsulfonate anion.

By the rare earths herein is meant lanthanum, cerium, praeseodymium, neodymium, promethium, samarium, europium, gadolinium, terbium, dysprosium, holmium, erbium, thulium, ytterbium, and lutetium.

The polymerization may be run at a temperature of about −80° C. to about 130° C., preferably about 0° C. to about 110° C. If this temperature is above the boiling point of the cyclic ether monomer, a pressure vessel may be used. The temperature range used in the polymerization will be dependent on many variables, particularly the reactivity and stability of the cationic catalyst used. Particular temperatures for various catalysts can be found in references wherein those catalysts are described. An inert solvent such as di-n-butyl ether, diethyl ether or toluene may be used, but it is preferred if solvents are not present. Protic compounds such as water, methanol and ethanol should preferably not be present, and it is convenient to exclude them by drying the starting materials and keeping the process under an inert dry gas such as nitrogen or dry air. As in most chemical processes, the ingredients should be mixed at least initially. Continued agitation is preferred to assure that the process materials remain well mixed, and to avoid overheating. The polymerization is mildly exothermic. If the polymerization temperature goes up appreciably, refluxing of the monomer may be used to help cool the process. Dependent on the particular catalyst used, the process may be run in batch, semibatch and/or continuous modes.

The compounds used as accelerators herein are silicon compounds in which one or more silicon atoms is bound to a group whose conjugate acid has a pKa of 16 or less in water which is referred to in claim 6 as a "first group". In essence, if one labels the group bound to silicon is whose conjugate acid has a pKa of 16 or less in water as "Q—" (or simply "Q" if monovalent), such as in

  (I), then the conjugate acid of Q— is —QH, where a hydrogen atom has taken the place of the silicon atom. —Q groups may be "monovalent (have no "tail"), for example halide ion. The wavy line on Q represents another group bound to a Q which is "divalent". For instance when Q— is acetoxy, —QH is acetic acid, and the wavy line represents the methyl group of the acetic acid. However, an accelerator molecule may have more than one Q— group, and/or more than one silicon atom which is bound to a Q— group as in

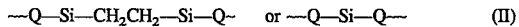  (II)

and

  (III).

Thus a silicon compound which contains a group (Q—) whose conjugate acid has a pKa in water of 16 or less can be mono- or polyfunctional accelerator. Assuming the conjugate acid of each Q— group in the molecule has a pKa in water of 16 or less, each can take part in the polymerization reaction. If different types of Q— groups are involved, they may react at different rates. Similarly, if the environment around silicon atoms which are bound to Q— groups in the same molecule are different, the Q— groups may react at differing rates.

Since it is difficult or impossible to measure the pKa of acids which are greater than about 14 in water, such pKa's can be estimated by extrapolation from another solvent such as dimethylsulfoxide. It is preferred if a Q— group (or the group which has a pKa of less than about 16 which is bonded to a silicon atom) having a conjugate acid with a pKa of less than 7 in water is used, more preferred if it has a pKa of less than 6, and most preferred if it has a pKa of −4 to 5. Useful Q— groups (mono- and divalent) include chloro, bromo, iodo, acyloxy [—C(O)O—], aryloxy, alkoxy, nitrile (—C≡N), and phosphato [O=P(—O—)$_3$]. Preferred Q— groups are chloro, bromo, and acyloxy [—C(O)O—]. Specific preferred Q groups are trifluoroacetate, acetate, formate, terephthalate, adipate, bromoacetate, chloroacetate, and fluoroacetate.

The novel products of the polymerization are

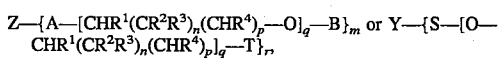

wherein all the symbols are as described above (in these formulas all symbols are nonstandard, except for the numbers, C which is carbon, H which is hydrogen, and O which is oxygen). When m or r is 1, the polyether is made using a compound such as (I) as the accelerator. When A and B are present and m is 2, then a compound such as (III) would have been used as the accelerator, and when S and T are present and r is 2, then a compound such as (II) would have been used as the accelerator. Polyethers where m is greater than 2 can be made by using accelerators analogous to those described immediately above. In other words, m in the product polyether formulas is equal to the number of A groups (synonymous in this instance to Q—), and r is equal to the number of B groups (synonymous in this instance to silicon atoms which are bonded to Q— groups), which are bonded to Z and Y respectively.

The accelerators herein should not "react significantly" with the polymerization catalyst, nor should the accelerator itself (in the absence of catalyst) cause polymerization of the cyclic ether. By not reacting significantly means that little of the catalyst and accelerator react before the polymerization is carried out. In other words, if the reaction between the catalyst and accelerator is much slower than the polymerization, significant reaction would not have taken place.

Open bonds to silicon atoms herein, that is where the group bonded to silicon is not specified, are bonds to a group whose conjugate acid has a pKa of 16 or less (in other words a Q— group), a hydrocarbyl or substituted hydrocarbyl group wherein the substituents are inert under the polymerization process conditions, a siloxy group or a silyl group. The silicon compound herein may be a polymer, such as a polysiloxane or a polysilane which has Q— groups on one, a few, or many of the silicon atoms in the polymer.

In preferred polyethers produced by the process described herein, n is 2, or n is 0 and p is 1, or n and p are both 0. In other preferred polyethers all of $R^1$, $R^2$, $R^3$ and $R^4$ are hydrogen, or all of $R^2$, $R^3$ and $R^4$ are hydrogen and $R^1$ is alkyl containing 1 to 4 carbon atoms, more preferably $R^1$ is methyl. It is especially preferred when n is 2 and all of $R^1$, $R^2$, $R^3$ and $R^4$ are hydrogen, or all of $R^2$, $R^3$ and $R^4$ are hydrogen and $R^1$ is alkyl containing 1 to 4 carbon atoms, more preferably $R^1$ is methyl. In all of the polyether products, it is preferred if m is 1 or if m is 2, 3, 4, or 5, and especially preferred if m is 2. Since the number r may represent the number of Q— groups in a polysiloxane or polysilane its value is in principle unlimited, but it is preferred if it is less than 3000. However, it is more preferred if r is 1 or 2, or between 5 and 500. It is also preferred if q is 5 or more, more preferred if q is 8 or more, especially preferred if q is 10 or more, and particularly preferred if q is 25 or more. Although there is no upper limit on q, it is preferred in all instances if q is less than 500, and more preferred if q is less than 100. By hydrocarbyl herein is meant a univalent radical containing only carbon and hydrogen.

Some of these polyethers are made from cyclic ethers of the formula

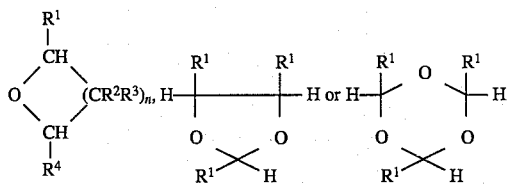

wherein all the symbols are as described above. In preferred starting cyclic ethers n, $R^1$, $R^2$, $R^3$ and $R^4$ are as described above for the products of the polymerization of the cyclic ethers.

In the polyethers produced by the instant process, using the silicon containing accelerators, one end group may a relatively inert group such as a halogen (not fluorine), ester or ether, while the other end group may be a "silicon ether" often called an alkoxysilane In other polyethers alkoxysilane may be present internally in the polyether chain while the end groups are halogen (not fluorine), ester or ether, or there may be internal ester or ether (derived from the accelerator) groups and alkoxysilane end groups. In all of these polyethers, if the relatively easily hydrolyzed alkoxysilane groups are hydrolyzed, the resulting polymer may have hydroxyl groups on both ends and thereby be useful as a monomer, or have a hydroxyl group on one end and be useful as a macromonomer. In addition the silylated and unsilylated polyethers produced herein are also useful in many of the other uses listed in the Technical Background section.

In the Examples, the following abbreviations and names are used:

GPC—gel permeation chromatography

Mn—number average molecular weight

Mw—weight average molecular weight

Nafion—A perfluorinated polymer which contains perfluorinated side chains which have sulfonic acid groups and available from E. I du Pont de Nemours and Co., Wilmington, Del., U.S.A.

PD—polydispersity (Mw/Mn)

PS—polystyrene

THF—tetrahydrofuran

EXAMPLE 1

Polymerization of THF with Trimethylsilyl Acetate and Ytterbium Triflate

In a dry box, ytterbium triflate (3.00 g) was added to a 100 mL round bottom flask equipped with a stirring bar. The flask was sealed with a rubber septum and removed from the dry box. After the attachment of a nitrogen bleed THF (20.00 mL) was added followed by trimethylsilyl acetate (2.00 mL). After 60 minutes the polymerization was terminated by the addition of water (10 mL), THF (25 mL) and diethyl ether (25 mL). The resulting organic phase was separated, concentrated at reduced pressure and then dried under vacuum. Polymer yield: 10.95 g. GPC analysis: Mn=10200, Mw=22400, PD=2.18 (PS STD.).

EXAMPLE 2

Polymerization of THF with Dimethyldiformoxysilane and Ytterbium Triflate

In a dry box, ytterium triflate (1.50 g) was added to each of three separate oven dried 100 mL RB flasks equipped with stirring bars. The flasks were sealed with rubber septa and then removed from the dry box. Nitrogen bleeds were attached and THF (10.00 mL) and dimethyldiformoxysilane (3.50 mL) were added to each flask. After 15, 30, and 60 minutes a polymerization was terminated via the addition of water (25 mL), ether (25 mL) and THF (50 mL). The resulting organic phases were separated, concentrated at reduced pressure and then dried under vacuum. Polymer yields and GPC analyses:

| Polymer. Time | Polymer Yield (g) | Mn (PS STD.) | Mw | PD |
|---|---|---|---|---|
| 15 mins. | 4.48 | 6280 | 10200 | 1.62 |
| 30 mins. | 5.42 | 5730 | 9800 | 1.71 |
| 60 mins. | 5.21 | 5380 | 9530 | 1.77 |

EXAMPLE 3

Polymerization of THF with Trimethylsilyl Tifluoroacetate and Ytterbium Triflate In a dry box, ytterbium triflate (3.00 g) was added to a 100 mL round bottom flask equipped with a stirring bar. The flask was sealed with a rubber septum and removed from the dry box. After the attachment of a nitrogen bleed THF (20.00 mL) was added followed by trimethylsilyltrifluoroacetate (2.00 mL) After 60 minutes the polymerization was terminated by the addition of water (10 mL), THF (25 mL) and diethyl ether (25 mL). The resulting organic phase was separated, concentrated at reduced pressure and then dried under vacuum. Polymer yield: 10.34 g. GPC analysis: Mn=7240, Mw=15600, PD=2.16 (PS STD.).

EXAMPLE 4

Polymerization of THF with Bis(trimethylsilyl) Terephthate and Ytterbium Triflate In a dry box, ytterbium triflate (3.00 g) was added to a 100 mL round bottom flask equipped with a stirring bar. The flask was sealed with a rubber septum and removed from the dry box. After the attachment of a nitrogen bleed THF (20.00 mL) was added followed by his (trimethylsilyl) terephthate (4.00 mL). After 60 minutes the polymerization was terminated by the addition of water (10 mL), THF (25 mL) and diethyl ether (25 mL). The resulting organic phase was washed with water (2×50 mL) separated, concentrated at reduced pressure and then dried under vacuum. Polymer yield: 13.86 g. GPC analysis: Mn=32700, Mw=67400, PD=2.06 (PS STD.).

EXAMPLE 5

Polymerization of THF with Trimethylsilylcyanide and Ytterbium Triflate

In a dry box, ytterbium triflate (3.00 g) was added to a 100 mL round bottom flask equipped with a stirring bar. The flask was sealed with a rubber septum and removed from the dry box. After the attachment of a nitrogen bleed THF (20.00 mL) was added followed by trimethylsilylcyanide (2.00 mL). After 60 minutes the polymerization was terminated by the addition of water (10 mL), THF (25 mL) and diethyl ether (25 mL). The resulting organic phase was separated, concentrated at reduced pressure and then dried under vacuum. Polymer yield: 0.98 g. GPC analysis: Mn=16400, Mw=25200, PD=1.57 (PS STD.).

EXAMPLE 6

Polymerization of THF with Trimethylsilyl Trimethylsiloxyacetate and Ytterbium Triflate In a dry box, ytterbium triflate (3.00 g) was added to a 100 mL round bottom flask equipped with a stirring bar. The flask was sealed with a rubber septum and removed from the dry box. After the attachment of a nitrogen bleed THF (20.00 mL) was added followed by trimethylsilyl trimethylsiloxyacetate (2.00 mL). After 60 minutes the polymerization was terminated by the addition of water (10 mL), THF (25 mL) and diethyl ether (25 mL). The resulting organic phase was separated, concentrated at reduced pressure and then dried under vacuum. Polymer yield: 3.36 g. GPC analysis: Mn=51900, Mw=67400, PD=1.30 (PS STD.).

EXAMPLE 7

Polymerization of THF with Bis(trimethylsilyl) Sebacate and Ytterbium Triflate In a dry box, ytterbium triflate (3.00 g) was added to a 100 mL round bottom flask equipped with a stirring bar. The flask was sealed with a rubber septum and removed from the dry box. After the attachment of a nitrogen bleed THF (20.00 mL) was added followed by bis(trimethylsilyl) sebacate (5.00 mL). After 60 minutes the polymerization was terminated by the addition of water (10 mL), THF (25 mL) and diethyl ether (25 mL). The resulting organic phase was washed with water (2×50 mL) separated, concentrated at reduced pressure and then dried under vacuum. Polymer yield: 12.35 g. GPC analysis: Mn=14400, Mw=27400, PD=1.90 (PS STD.).

EXAMPLE 8

Polymerization of THF with Bis(trimethylsilyl) Adipate and Ytterbium Triflate In a dry box, ytterbium triflate (3.00 g) was added to a 100 mL round bottom flask equipped with a stirring bar. The flask was sealed with a rubber septum and removed from the dry box. After the attachment of a nitrogen bleed THF (20.00 mL) was added followed by bis(trimethylsilyl) adipate (5.00 mL). After 60 minutes the polymerization was terminated by the addition of water (10 mL), THF (25 mL) and diethyl ether (25 mL). The resulting organic phase was washed with water (2×50 mL) separated, concentrated at reduced pressure and then dried under vacuum. Polymer yield: 11.15 g. GPC analysis: Mn=11700, Mw=20700, PD=1.77 (PS STD.).

EXAMPLE 9

Polymerization of THF with Vinylmethyl-diacetoxysilane and Ytterbium Triflate In a dry box, ytterbium triflate (3.00 g) was added to a 100 mL round bottom flask equipped with a stirring bar. The flask was sealed with a rubber septum and removed from the dry box. After the attachment of a nitrogen bleed THF (20.00 mL) was added followed by vinylmethyl-diacetoxysilane (5.00 mL). After 60 minutes the polymerization was terminated by the addition of water (10 mL), THF (25 mL) and diethyl ether (25 mL). The resulting organic phase was washed with water (2×50 mL) separated, concentrated at reduced pressure and then dried under vacuum. Polymer yield: 12.81 g. GPC analysis: Mn=5180, Mw=8900, PD=1.72 (PS STD.).

EXAMPLE 10

Polymerization of THF with Methyltriacetoxysilane and Ytterbium Triflate

In a dry box, ytterbium triflate (3.00 g) was added to a 100 mL round bottom flask equipped with a stirring bar. The flask was sealed with a rubber septum and removed from the dry box. After the attachment of a nitrogen bleed THF (20.00 mL) was added followed by methyltriacetoxysilane (5.00 mL). After 60 minutes the polymerization was terminated by the addition of water (10 mL), THF (25 mL) and diethyl ether (25 mL). The resulting organic phase was washed with water (2×50 mL) separated, concentrated at reduced pressure and then dried under vacuum. Polymer yield: 10.83 g. GPC analysis: Mn=4490, Mw=8470, PD=1.89 (PS STD.).

EXAMPLE 11

Polymerization of THF with Methyltriacetoxysilane and Bis(n-cyclopentadienyl)tetrahydrofuran-bis (trifluoromethanesulfonato)hafnium

In a dry box, bis(n-cyclopentadienyl)tetrahydrofuran-bis-(trifluoromethanesulfonato)hafnium (0.50 g) was added to a 100 mL round bottom flask equipped with a stirring bar. The flask was sealed with a rubber septum and removed from the dry box. After the attachment of a nitrogen bleed THF (20.00 mL) was added followed by methyltriacetoxysilane (2.50 mL). After 60 minutes the polymerization was terminated by the addition of water (10 mL), THF (25 mL) and diethyl ether (25 mL). The resulting organic phase was washed with water (2×50 mL) separated, concentrated at reduced pressure and then dried under vacuum. Polymer yield: 1.20 g. GPC analysis: Mn=14600, Mw=17400, PD=1.19 (PS STD.).

EXAMPLE 12

Polymerization of THF with Bis(trimethylsilyl)adipate and Bis(n-cyclopentadienyl)tetrahydrofuran-bis (trifluoromethanesulfonato)zirconium

In a dry box, bis(n-cyclopentadienyl) tetrahydrofuran-bis(trifluoromethanesulfonato) zirconium (0.50 g) was added to a 100 mL round bottom flask equipped with a stirring bar. The flask was sealed with a rubber septum and removed from the dry box. After the attachment of a nitrogen bleed THF (20.00 mL) was added followed by bis(trimethylsilyl) adipate (2.50 mL). After 60 minutes the polymerization was terminated by the addition of water (10 mL), THF (25 mL) and diethyl ether (25 mL). The resulting organic phase was washed with water (2× 50 mL) separated, concentrated at reduced pressure and then dried under vacuum. Polymer yield: 1.29 g. GPC analysis: Mn=16900, Mw=19400, PD=1.15 (PS STD.).

EXAMPLE 13

Polymerization of THF with Bis(trimethylsilyl) adipate and Zirconium Triflate

In a dry box, zirconium triflate (1.00 g) was added to a 100 mL round bottom flask equipped with a stirring bar. The flask was sealed with a rubber septum and removed from the dry box. After the attachment of a nitrogen bleed THF (20.00 mL) was added followed by bis(trimethylsilyl) adipate (2.50 mL). After 60 minutes the polymerization was terminated by the addition of water (10 mL), THF (25 mL) and diethyl ether (25 mL). The resulting organic phase was washed with water (2×50 mL) separated, concentrated at reduced pressure and then dried under vacuum. Polymer yield: 9.67 g. GPC analysis: Mn=28100, Mw=45700, PD=1.63 (PS STD.).

EXAMPLE 14

Polymerization of THF with Vinylmethyldiacetoxysilane and Yttrium Triflate

In a dry box, yttrium triflate (1.50 g) was added to a 100 mL round bottom flask equipped with a stirring bar. The flask was sealed with a rubber septum and removed from the dry box. After the attachment of a nitrogen bleed THF (10.00 mL) was added followed by vinylmethyldiacetoxysilane (2.50 mL). After 60 minutes the polymerization was terminated by the addition of water (10 mL), THF (25 mL) and diethyl ether (25 mL). The resulting organic phase was washed with water (2×50 mL) separated, concentrated at reduced pressure and then dried under vacuum. Polymer yield: 3.19 g. GPC analysis: Mn=20600, Mw=29900, PD=1.45 (PS STD.).

EXAMPLE 15

Polymerization of THF with Vinylmethyldiacetoxysilane and Erbium Triflate

In a dry box, erbium triflate (1.50 g) was added to a 100 mL round bottom flask equipped with a stirring bar. The flask was sealed with a rubber septum and removed from the dry box. After the attachment of a nitrogen bleed THF (10.00 mL) was added followed by vinylmethyldiacetoxysilane (2.50 mL). After 60 minutes the polymerization was terminated by the addition of water (10 mL), THF (25 mL) and diethyl ether (25 mL). The resulting organic phase was washed with water (2×50 mL) separated, concentrated at reduced pressure and then dried under vacuum. Polymer yield: 4.65 g. GPC analysis: Mn=25900, Mw=36400, PD=1.40 (PS STD.).

EXAMPLE 16

Polymerization of THF with Methyltriacetoxysilane and Erbium Triflate

In a dry box, erbium triflate (1.50 g) was added to a 100 mL round bottom flask equipped with a stirring bar. The flask was sealed with a rubber septum and removed from the dry box. After the attachment of a nitrogen bleed THF (10.00 mL) was added followed by methyltriacetoxysilane (2.50 mL). After 60 minutes the polymerization was terminated by the addition of water (10 mL), THF (25 mL) and diethyl ether (25 mL). The resulting organic phase was washed with water (2×50 mL) separated, concentrated at reduced pressure and then dried under vacuum. Polymer yield: 5.48 g. GPC analysis: Mn=16800, Mw=26100, PD=1.55 (PS STD.).

EXAMPLE 17

Polymerization of THF with Tris(trimethylsilyl) Phosphate and Aluminum Triflate

In a dry box, aluminum triflate (1.50 g) was added to a 100 mL round bottom flask equipped with a stirring bar. The flask was sealed with a rubber septum and removed from the dry box. After the attachment of a nitrogen bleed THF (10.00 mL) was added followed by tris (trimethylsilyl) phosphate (2.50 mL). After 60 minutes the polymerization was terminated by the addition of water (10 mL), THF (25 mL) and diethyl ether (25 mL). The resulting organic phase was washed with water (2×50 mL) separated, concentrated at reduced pressure and then dried under vacuum. Polymer yield: 3.11 g. GPC analysis: Mn=31700, Mw=93600, PD=2.95 (PS STD.).

EXAMPLE 18

Polymerization of THF with Di-t-butoxydiacetoxysilane and Ytterbium Triflate

In a dry box, ytterbium triflate (1.5 g) was added to a 100 mL round bottom flask equipped with a stirring bar. The flask was sealed with a rubber septum and removed from the dry box. After the attachment of a nitrogen bleed THF (10.00 mL) was added followed by di-t-butoxydiacetoxysilane (2.50 mL). After 60 minutes the polymerization was terminated by the addition of water (10 mL), THF (25 mL) and diethyl ether (25 mL). The resulting organic phase was washed with water (2×50 mL) separated, concentrated at reduced pressure and then dried under vacuum. Polymer yield: 4.31 g. GPC analysis: Mn=6440, Mw=9830, PD=1.53 (PS STD.).

EXAMPLE 19

Polymerization of THF with Trimethylsilylisocyanate and Ytterbium Triflate

In a dry box, ytterbium triflate (1.50 g) was added to a 100 mL round bottom flask equipped with a stirring bar. The flask was sealed with a rubber septum and removed from the dry box. After the attachment of a nitrogen bleed THF (10.00 mL) was added followed by trimethylsilylisocyanate (3.50 mL). After 60 minutes the polymerization was terminated by the addition of water (10 mL), THF (25 mL) and diethyl ether (25 mL). The resulting organic phase was washed with water (2×50 mL) separated, concentrated at reduced pressure and then dried under vacuum. Polymer yield: 0.27 g. GPC analysis: Mn=41600, Mw=50600, PD=1.22 (PS STD.).

EXAMPLE 20

Polymerization of THF with 1,1,1,3,3,-Pentamethyl-3 -acetoxydisiloxane and Ytterbium Triflate In a dry box, ytterbium triflate (1.50 g) was added to a 100 mL round bottom flask equipped with a stirring bar. The flask was sealed with a rubber septum and removed from the dry box. After the attachment of a nitrogen bleed THF (10.00 mL) was added followed by 1,1,1,3,3,-pentamethyl-3-acetoxydisiloxane (3.50 mL) . After 60 minutes the polymerization was terminated by the addition of water (10 mL), THF (25 mL) and diethyl ether (25 mL). The resulting organic phase was washed with water (2×50 mL) separated, concentrated at reduced pressure and then dried under vacuum. Polymer yield: 5.67 g. GPC analysis: Mn=12000, Mw=20000, PD=1.65 (PS STD.).

EXAMPLE 21

Polymerization of THF with Dimethyldiformoxysilane and Nafion®

In a dry box, Nafion® (5.87 g) was added to a 100 mL round bottom flask equipped with a stirring bar. The flask was sealed with a rubber septum and removed from the dry box. After the attachment of a nitrogen bleed THF (20.00 mL) was added followed by dimethyldiformoxysilane (5.00 mL). After 120 minutes the polymerization solution was poured from the solid catalyst. The solid catalyst was washed with THF (2×25 mL). The combined organic solution was then concentrated at reduced pressure and then dried under vacuum. Polymer yield: 3.89 g. GPC analysis: Mn=5760, Mw=10200, PD=1.78 (PS STD.).

EXAMPLE 22

Polymerization of THF with 4-(tert-Butyldimethylsiloxy)- 3-pentene-2-one and Erbium Triflate In a dry box, erbium triflate (3.00 g) was added to a 100 mL round bottom flask equipped with a stirring bar. The flask was sealed with a rubber septum and removed from the dry box. After the attachment of a nitrogen bleed THF (20.00 mL) was added followed by 4 -(tert-butyldimethylsiloxy)- 3-pentene-2-one (3.00 mL). After 60 minutes the polymerization was terminated by the addition of water (10 mL), THF (25 mL) and diethyl ether (25 mL). The resulting organic phase was washed with water (2×50 mL) separated, concentrated at reduced pressure and then dried under vacuum. Polymer yield: 2.79 g. GPC analysis: Mn=9570, Mw=16000, PD=1.68 (PS STD.).

EXAMPLE 23

Polymerization of THF with 1-(Trimethylsiloxy)cyclohexene and Erbium Triflate

In a dry box, erbium triflate (3.00 g) was added to a 100 mL round bottom flask equipped with a stirring bar.. The flask was sealed with a rubber septum and removed from the dry box. After the attachment of a nitrogen bleed THF (20.00 mL) was added followed by 1-(trimethylsiloxy) cyclohexene (3.00 mL) . After 60 minutes the polymerization was terminated by the addition of water (10 mL), THF (25 mL) and diethyl ether (25 mL). The resulting organic phase was washed with water (2×50 mL) separated, concentrated at reduced pressure and then dried under vacuum. Polymer yield: 0.43 g. GPC analysis: Mn=38700, Mw=53300, PD=1.38 (PS STD.).

EXAMPLE 24

Polymerization of THF with Tetramethoxysilane and Erbium Triflate

In a dry box, erbium triflate (3.00 g) was added to a 100 mL round bottom flask equipped with a stirring bar. The flask was sealed with a rubber septum and removed from the dry box. After the attachment of a nitrogen bleed THF (20.00 mL) was added followed by tetramethoxysilane (3.00 mL). After 60 minutes the polymerization was terminated by the addition of water (10 mL), THF (25 mL) and diethyl ether (25 mL). The resulting organic phase was washed with water (2×50 mL) separated, concentrated at reduced pressure and then dried under vacuum. Polymer yield: 0.43 g. GPC analysis: Mn=5670, Mw=8100, PD=1.43 (PS STD.).

EXAMPLE 25

Polymerization of THF with tert-Butyldimethylchlorosilane and Ytterbium Triflate In a dry box, ytterbium triflate (3.00 g) and tert-butyldimethylchlorosilane (3.00 g) were added to a 100 mL round bottom flask equipped with a stirring bar. The flask was sealed with a rubber septum and removed from the dry box. After the attachment of a nitrogen bleed THF (20.00 mL) was added. After 180 minutes the polymerization was terminated by the addition of water (10 mL), THF (25 mL) and diethyl ether (25 mL). The resulting organic phase was washed with water (2× 50 mL) separated, concentrated at reduced pressure and then dried under vacuum. Polymer yield: 4.8 g.

EXAMPLE 26

Polymerization of THF with Dimethyldichlorosilane and Ytterbium Triflate

In a dry box, ytterbium triflate (3.00 g) was added to a 100 mL round bottom flask equipped with a stirring bar. The flask was sealed with a rubber septum and removed from the dry box. After the attachment of a nitrogen bleed THF (20.00 mL) and dimethyldichlorosilane (3.00 g) were added. After 60 minutes the polymerization was terminated by the addition of water (10 mL), THF (25 mL) and diethyl ether (25 mL). The resulting organic phase was washed with water (2×50 mL) separated, concentrated at reduced pressure and then dried under vacuum. Polymer yield: 11.98 g.

EXAMPLE 27

Polymerization of THF with p-Trimethylsiloxynitrobenzene and Ytterbium Triflate

In a dry box, ytterbium triflate (3.00 g) was added to a 100 mL round bottom flask equipped with a stirring bar. The flask was sealed with a rubber septum and removed from the dry box. After the attachment of a nitrogen bleed THF (20.00 mL) and p-trimethylsiloxynitrobenzene (3.00 g) were added. After 60 minutes the polymerization was terminated by the addition of water (10 mL), THF (25 mL) and diethyl ether (25 mL). The resulting organic phase was washed with water (2×50 mL) separated, concentrated at reduced pressure and then dried under vacuum. Polymer yield: 3.06 g.

EXAMPLE 28

Polymerization of THF with Bromotrimethylsilylacetate and Ytterbium Triflate

In a dry box, ytterbium triflate (3.00 g) was added to a 100 mL round bottom flask equipped with a stirring bar. The flask was sealed with a rubber septum and removed from the dry box. After the attachment of a nitrogen bleed THF (20.00 mL) and bromotrimethylsilylacetate (3.00 g) were added. After 60 minutes the polymerization was terminated by the addition of water (10 mL), THF (25 mL) and diethyl ether (25 mL). The resulting organic phase was washed with water (2×50 mL) separated, concentrated at reduced pressure and then dried under vacuum. Polymer yield: 12.90 g.

What is claimed is:

1. In a process for cationic polymerization of cyclic ethers comprising contacting a cationic catalyst with one or more tetrahydrofurans, oxepanes, 1,3-dioxolanes or 1,3,5-trioxanes, to produce a polyether; the improvement consisting essentially of contacting an accelerator with the polymerization mass wherein said accelerator comprises silicon bound to a group whose conjugate acid has a pKa in water of less than about 16, and provided that:

said accelerator does not significantly react with said cationic catalyst for said cationic polymerization in the absence of said tetrahydrofurans, oxepanes, 1,3-dioxolanes or 1,3,5-trioxanes;

said accelerator does not itself cause polymerization of said tetrahydrofurans, oxepanes, 1,3-dioxolanes or 1,3,5-trioxanes to produce a polyether; and wherein said process is carried out at about −80° C. to about 130° C., and water is not present.

2. The process as recited in claim 1 wherein said cyclic ether comprises the formula

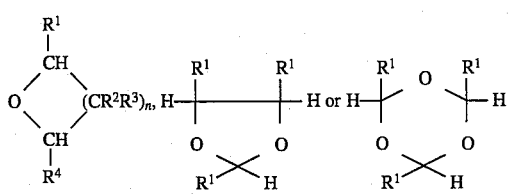

wherein:

each $R^1$, $R^2$, $R^3$, and $R^4$ is independently hydrogen or hydrocarbyl containing 1 to 20 carbon atoms; and n is 2 or 4.

3. The process as recited in claim 2 wherein n is two, $R^1$ is hydrogen or alkyl containing 1 to 4 carbon atoms, and each $R^2$, $R^3$ and $R^4$ is hydrogen.

4. The process as recited in claim 1 wherein said pKa is less than 7.

5. The process as recited in claim 1 wherein said group bound to silicon is selected from chloro, bromo, and acyloxy.

6. A process for the production of polyethers, consisting essentially of, contacting at a temperature of about −80° C. to about 130° C., a Bronsted or Lewis acid with one or more tetrahydrofurans, oxepanes, 1,3-dioxolanes or 1,3,5-trioxanes, and an accelerator, wherein said accelerator is a silicon compound having a group bound directly to a silicon atom whose conjugate acid has a pKa of less than about 16 in water, and provided that:

said accelerator does not significantly react with said Bronsted or Lewis acid in the absence of said tetrahydrofurans, oxepanes, 1,3-dioxolanes or 1,3,5-trioxanes;

said accelerator does not itself cause polymerization of said tetrahydrofurans, oxepanes, 1,3-dioxolanes or 1,3,5-trioxanes to produce a polyether; and water is not present.

7. The process as recited in claim 6 wherein said tetrahydrofuran, oxepane, 1,3-dioxolane or 1,3,5-trioxane comprises the formula

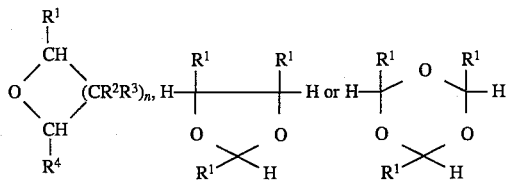

wherein:

each $R^1$, $R^2$, $R^3$, and $R^4$ is independently hydrogen or hydrocarbyl containing 1 to 20 carbon atoms; and n is 2 or 4.

8. The process as recited in claim 7 wherein n is 2, $R^1$ is hydrogen or alkyl containing 1 to 4 carbon atoms, and each $R^2$, $R^3$ and $R^4$ is hydrogen.

9. The process as recited in claim 6 wherein said pKa is less than 7.

10. The process as recited in claim 6 wherein said group is selected from chloro, bromo, and acyloxy.

11. The process as recited in claim 6 wherein said Lewis acid is a divalent strontium, barium, cobalt, rhodium, iridium, palladium, platinum, chromium, zinc, cadmium or mercury; trivalent scandium, yttrium, a rare earth metal, arsenic, antimony, bismuth, gold, iron, ruthenium, osmium, aluminum, gallium, indium or thulium; tetravalent titanium, zirconium, hafnium, molybdenum, silicon, germanium, tin, or lead; pentavalent rhenium, vanadium, niobium or tantalum; or hexavalent tungsten perfluoroalkylsulfonate.

12. The process as recited in claim 11 wherein said perfluoroalkylsulfonate is triflate containing yttrium, a rare earth metal, mischmetall, scandium, zirconium, tantalum, zinc or bismuth.

* * * * *